H. G. HOOPS.
CHICKEN BROODER.
APPLICATION FILED JUNE 30, 1908.

911,500.

Patented Feb. 2, 1909.
2 SHEETS—SHEET 1.

Witnesses

Inventor
Henry G. Hoops.
By C. A. Snow & Co.
Attorneys

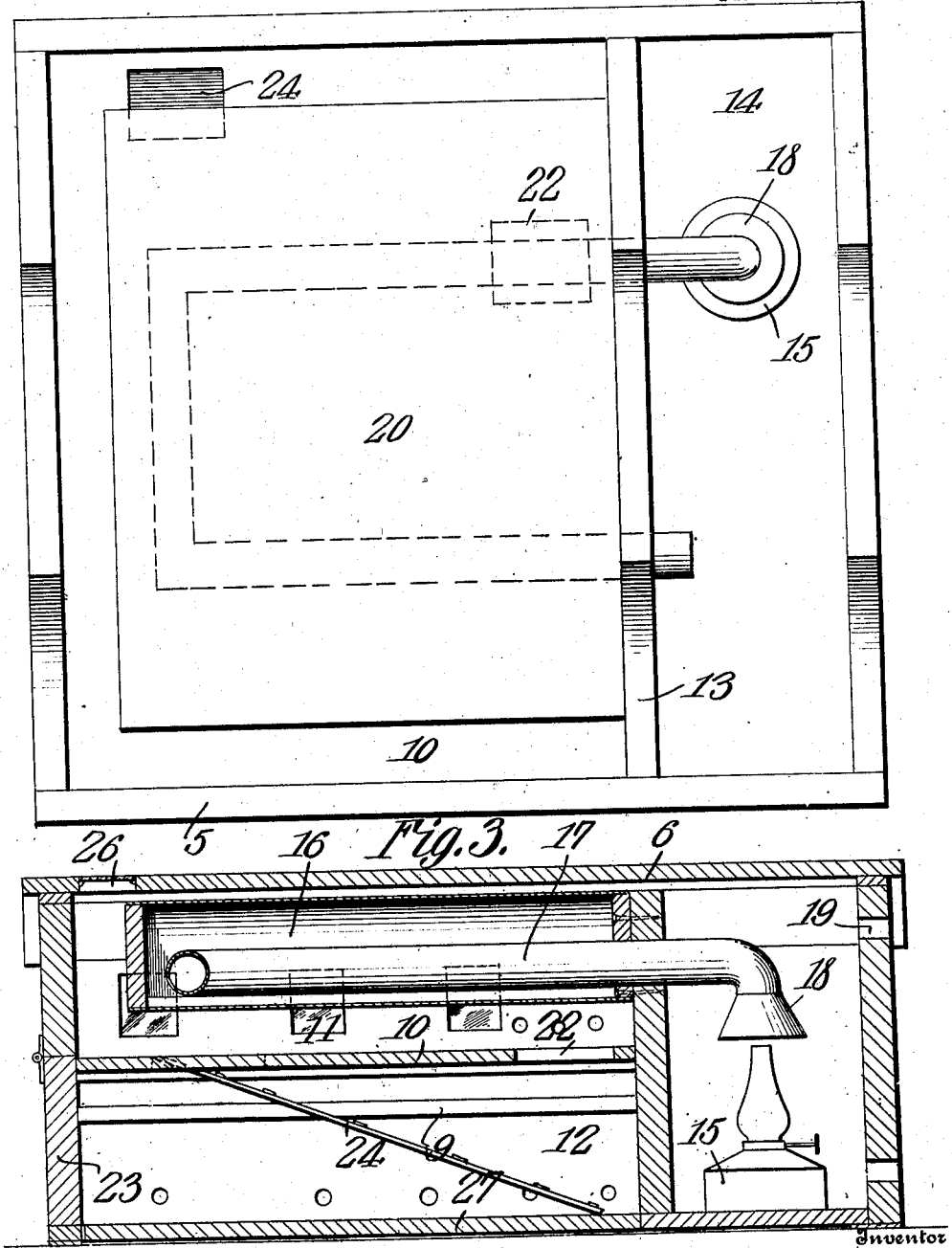

UNITED STATES PATENT OFFICE.

HENRY G. HOOPS, OF BYRON, NEBRASKA, ASSIGNOR OF ONE-HALF TO GEORGE BOSTELMAN.

CHICKEN-BROODER.

No. 911,500.      Specification of Letters Patent.      Patented Feb. 2, 1909.

Application filed June 30, 1908. Serial No. 441,164.

*To all whom it may concern:*

Be it known that I, HENRY G. HOOPS, a citizen of the United States, residing at Byron, in the county of Thayer and State of Nebraska, have invented a new and useful Chicken-Brooder, of which the following is a specification.

This invention relates to brooders and has for its object to provide a comparatively simple and inexpensive device of this character especially designed for protecting young chicks until they are large enough to take care of themselves.

A further object of the invention is to effect certain improvements in the construction of the brooder whereby the same may be more readily and efficiently cleaned than heretofore.

A still further object of the invention is to provide improved means for heating the hover compartment, and means for preventing overcrowding of the chickens in said hover compartment.

Further objects and advantages will appear in the following description, it being understood that various changes in form, proportions and minor details of construction may be resorted to within the scope of the appended claims.

Figure 1:
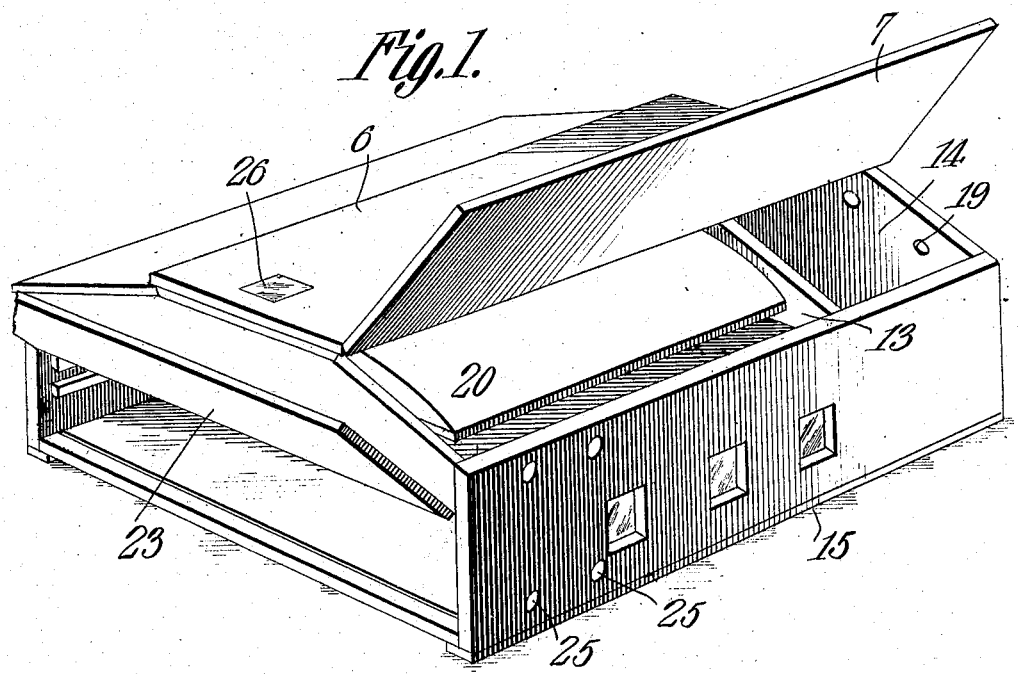
Figure 2:
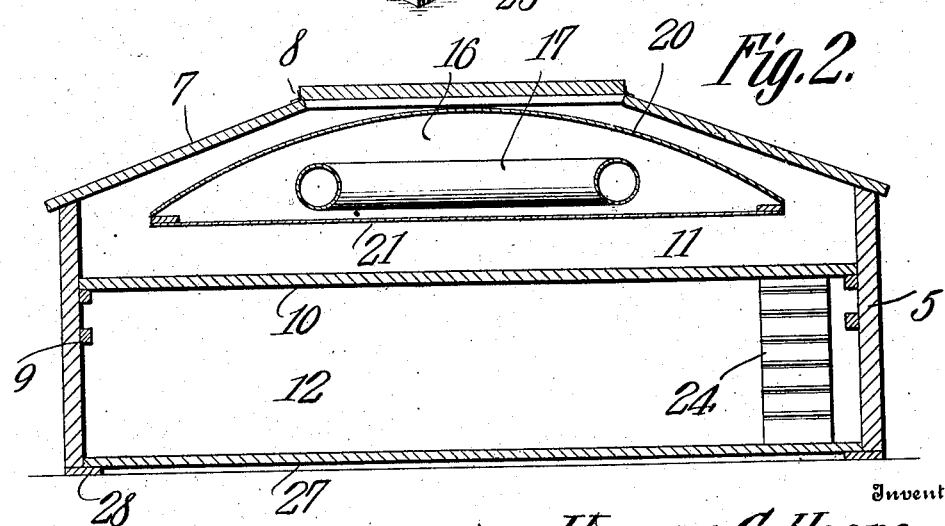

In the accompanying drawings forming a part of this specification: Figure 1 is a perspective view of a brooder constructed in accordance with my invention. Fig. 2 is a transverse sectional view of the same. Fig. 3 is a top plan view of the brooder with the cover removed. Fig. 4 is a longitudinal sectional view.

Similar numerals of reference indicate corresponding parts in all of the figures of the drawings.

The improved brooder forming the subject matter of the present invention comprises a casing or housing 5 preferably rectangular in shape, as shown, and including a top section 6 having cover sections 7 hingedly connected thereto at 8 so that access may be readily had to the interior of the brooder.

Secured to the inner faces of the side walls of the brooder are a series of spaced cleats or guides 9 adapted to support a removable upper floor 10, which latter divides the interior of the brooder into two compartments, 11 and 12, one of which constitutes a hover compartment and the other a chamber into which the chicks pass after leaving said hover compartment.

Extending transversely across the interior of the brooder and bearing against the removable floor 10 is a partition 13, the latter being spaced from the front wall of the casing to form a chamber 14 for the reception of a lamp or similar heating device, indicated at 15.

Disposed within the hover compartment 11 is a heating chamber 16 preferably segmental in cross section and having one wall thereof bolted or otherwise rigidly secured to the partition 13 and its opposite end and side walls spaced from the interior walls of the brooder to form a passage thereby to permit circulation of hot air within the hover chamber.

Disposed within the heating chamber 16 is a hot air flue or pipe 17, one end of which is provided with a funnel shaped terminal 18 arranged above the lamp or heating device 15, while the opposite end of the tube projects through the rear wall of said chamber, there being suitable apertures 19 formed in the front wall of the brooder through which air is admitted to the lamp, as best shown in Fig. 1 of the drawing.

Secured to the transversely curved cover 20 of the heating chamber is a hover cloth 21 formed of white flannel, felt or other suitable material, said hover cloth being spaced from the removable floor section 10 so as to allow the young chicks to hover beneath the heating chamber with their backs against the cloth 21.

In order to prevent over-crowding of the chicks within the hover compartment 11 the removable floor section 10 is provided with an opening 22 preferably disposed at the warmest part of the brooder, that is to say at the point of entrance of the hot air flue 17 into the heating chamber, and through which the chickens may drop into the lower compartment 12.

One end of the compartment 12 is closed by a pivoted end wall 23 capable of being swung upwardly to open position so as to permit the chicks that are forced or crowded through the opening 22 into the compartment 12 to pass from said compartment to a barn-yard or other suitable inclosure.

A ladder or stairway 24 is preferably arranged within the compartment 12 so that the chicks may pass from said compartment to the hover compartment 11, there being suitable windows formed in the walls of the hover compartment so that the chicks will be attracted by the light and thus ascend the ladder.

Attention is here called to the fact that the partition 13 extends the entire height of the brooder and forms an air tight barrier between the compartments 11 and 14 thereby to prevent the gases arising from the lamp 15 from entering the hover compartment and smothering or otherwise injuring the chickens.

The side walls of the casing are preferably provided with transversely alined openings 25 so as to permit the circulation of fresh air transversely through both the compartments 11 and 12.

By making the cover 20 of the heating chamber substantially concavo-convex in cross section the heated air is deflected downwardly against the hover cloth 21, thus maintaining the latter at a uniform temperature.

If desired, suitable display openings 26 may be formed in the cover 6 so that the operator may view the movements of the chicks within the brooder.

The brooder is preferably provided with a removable bottom section 27, which latter rests on suitable cleats 28 carried by the side walls so that both the upper and lower floor sections 10 and 27, respectively, may be readily removed and cleaned when necessary.

The brooder may be made in different sizes and shapes and any number of pipes or flues may be arranged within the heating compartment without departing from the spirit of the invention.

Having thus described the invention what is claimed is:

1. A brooder including a casing having hinged cover sections and provided with a pivoted end wall, a removable floor disposed within the casing and dividing the interior thereof into superposed compartments, a heating chamber arranged within the upper compartment of the casing and having a concavo-convex upper wall, a hover cloth secured to the opposite longitudinal edges of said concavo-convex upper wall and spaced from the floor, a heating flue extending within the heating chamber, and a heating device communicating with one end of the flue.

2. A brooder including a casing having perforated side walls, the inner faces of which are provided with a series of horizontally disposed guides, a removable upper floor supported on some of said guides and dividing the interior of the brooder into superposed compartments, a partition extending transversely across the casing at one end thereof and spaced from the adjacent wall of the latter to form a forward chamber, a heating chamber arranged within the upper compartment of the casing and having one wall thereof secured to the partition, the opposite end and side walls of the heating chamber being spaced from the adjacent interior walls of the upper compartment of said casing, a hover cloth forming the bottom of the heating chamber and spaced from the upper floor, a heating device arranged within the forward chamber of the casing, a flue disposed within the heating chamber and having one end thereof extending above the heating device and its opposite end communicating with the interior of the forward chamber, there being spaced openings in the upper floor section forming a source of communication between the upper and lower compartments of the casing, one of said openings being disposed at the point of entrance of the flue within the heating chamber, and a removable lower floor forming the bottom of the brooder.

In testimony that I claim the foregoing as my own, I have hereto affixed my signature in the presence of two witnesses.

HENRY G. HOOPS.

Witnesses:
PAUL WURL,
FRANK SCHUKAR.